Patented Dec. 27, 1938

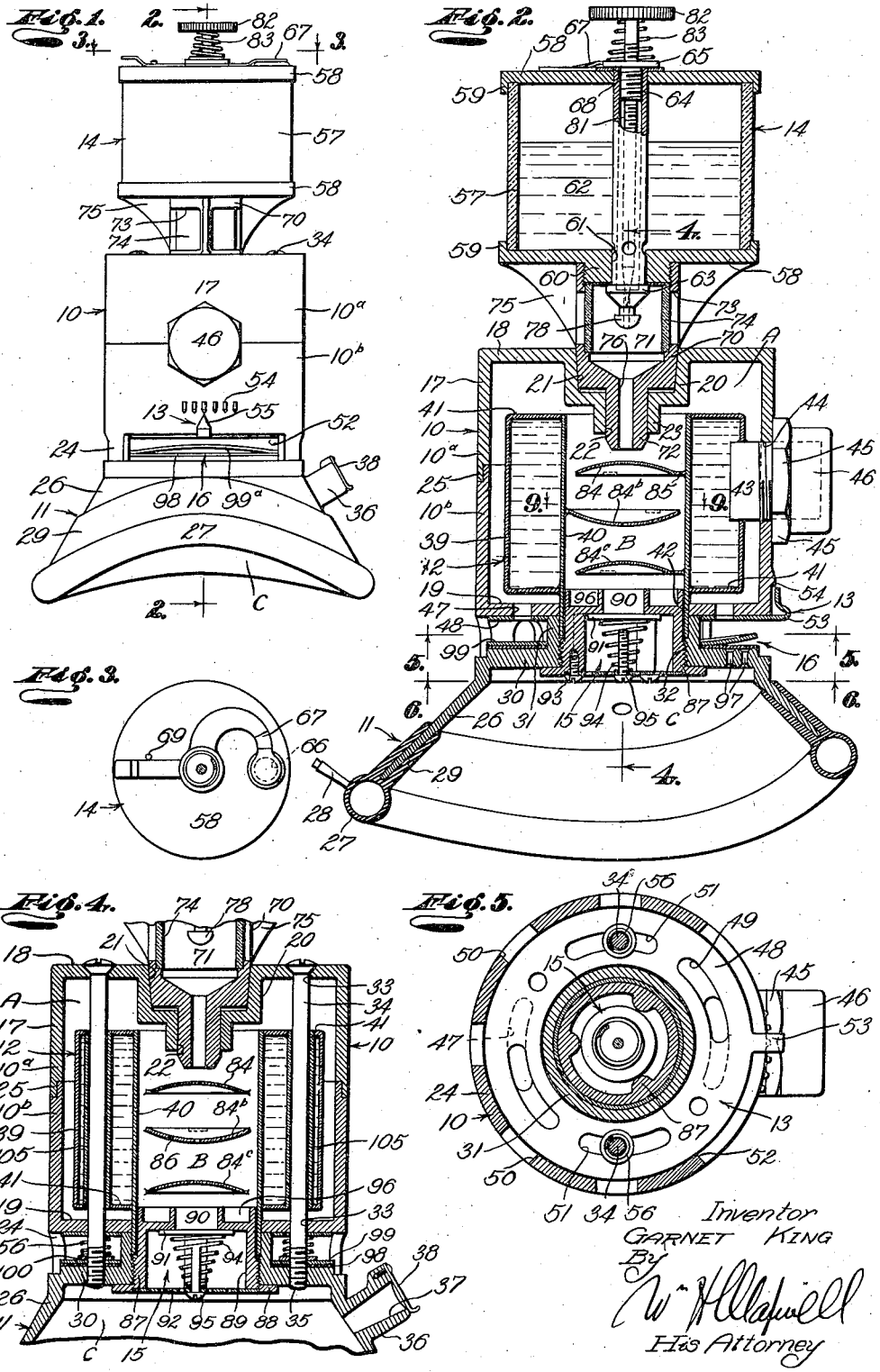

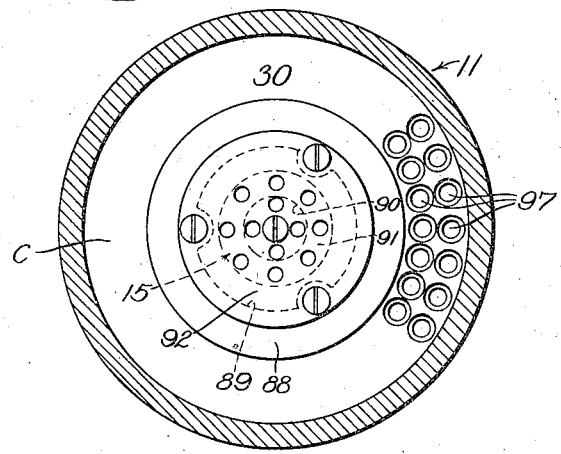
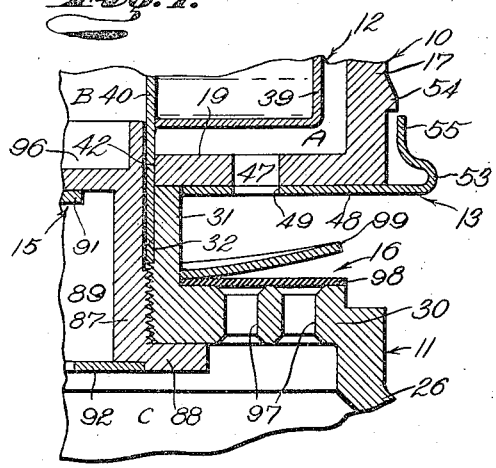
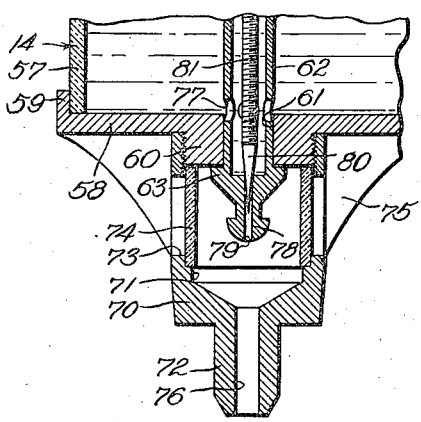
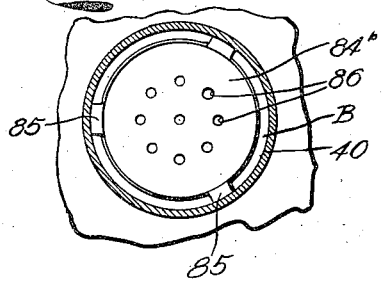

2,141,794

UNITED STATES PATENT OFFICE 2,141,794

APPARATUS FOR ADMINISTERING ANESTHETICS

Garnet King, Los Angeles, Calif., assignor of one-half to Frances King, Los Angeles, Calif.

Application May 6, 1936, Serial No. 78,120

15 Claims. (Cl. 128—188)

This invention relates to apparatus for facilitating the administering of anesthetics and relates more particularly to apparatus useful in inducing anesthesia by ether, and the like. A general object of this invention is to provide an anesthetic administering device that is compact, safe and dependable and capable of inducing effective anesthesia with a minimum of ill effects and discomfort to the patient.

It is well known by those skilled in the art that it is desirable to employ heat to effect the complete and proper volatilization of normally liquid anesthetics to produce anesthesia with a minimum of ill effects to the patient. Numerous anesthetic administering devices have been devised employing electrical heating elements to produce the volatilization of normally liquid anesthetics. Ether and similar anesthetics are highly inflammable and sometimes explosive and it is extremely hazardous to employ an anesthetic administering device embodying an electric heating means. A minor defect in the electric heating apparatus may result in a fire or explosion and sometimes death of the patient. For this reason anesthetic administering devices embodying electric heating means are often barred from operating rooms.

In my co-pending application entitled "Device for administering anesthetics," Serial No. 4,684, I have disclosed and claimed a device wherein the anesthesiant mixture of air and vaporized anesthetic is heated or warmed in a mixing chamber immediately adjacent the breathing chamber of the patient's mask, said heating or warming of the anesthesiant mixture being accomplished without the employment of electrical means or other means liable to ignite the mixture.

Another object of the present invention is to provide a practical, effective apparatus for administering anesthetics that operates to heat or warm the air prior to its admission to the mixing chamber and to heat or warm the mixture of air and anesthetic in the mixing chamber to produce an anesthesiant mixture that induces anesthesia with little or no nausea, headache, bronchial irritation and with little variation in the blood pressure and practically no excitation.

Another object of this invention is to provide an apparatus for administering anesthetics that is in the form of a compact unit adapted to be applied directly over the oral and nasal cavities of the patient and that embodies an improved means for heating the air prior to its admission to the mixing chamber and for heating the controlled mixture of air and anesthetic in the mixing chamber which heating means maintains the proper temperatures throughout the various phases of the anesthesia without danger of igniting the anesthetic or anesthesiant mixture. The maintaining of the proper temperatures in the air compartment and the mixing chamber provides for the proper complete volatilization of the anesthetic in the warm air and positively prevents the delivery of raw liquid anesthetic to the patient.

Another object of this invention is to provide an anesthetic administering device of the character mentioned in which the heating means insures the proper relatively high temperatures in the air chamber and mixing chamber throughout the induction period of the anesthesia and automatically provides for desirable lower temperatures during the subsequent phases of the anesthesia.

Another object of this invention is to provide an anesthetic administering device that embodies an improved and simplified relationship and arrangement of parts wherein an annular or tubular container may contain a heating medium to heat the air in a surrounding air chamber and to heat an internal mixing chamber which receives the anesthetic and the heated air from the surrounding air chamber.

Another object of this invention is to provide an anesthetic administering device of the character mentioned that embodies novel and effective baffles in the mixing chamber for breaking up the liquid anesthetic admitted to the chamber.

Another object of this invention is to provide an anesthetic administering device of the character mentioned that does not embody a sponge, gauze or any other absorbent element requiring replenishment.

Another object of this invention is to provide an anesthetic administering device that embodies novel and simplified inlet and exhaust valves for the breathing chamber of the mask.

Another object of this invention is to provide an improved device for administering anesthetics in which the principal parts of the body, mask, etc. are simple in construction and capable of fabrication of Bakelite or other relatively light material.

A further object of this invention is to provide an anesthetic administering device of the character mentioned in which the air chamber forms an insulating space around the container for the heating medium whereby the device may be readily grasped and handled at any time.

The various objects and features of my invention will be fully understood from the following detailed description of a typical preferred form and application of the invention, throughout which description reference is made to the accompanying drawings, in which:

Fig. 1 is a front elevation view of the apparatus provided by the present invention. Fig. 2 is an enlarged central longitudinal detailed sectional view of the apparatus taken substantially as indicated by line 2—2 on Fig. 1. Fig. 3 is a top or plan view of the reservoir taken as indicated by line 3—3 on Fig. 1. Fig. 4 is a fragmentary vertical detailed sectional view taken as indicated by line 4—4 on Fig. 2. Fig. 5 is a transverse or horizontal detailed sectional view taken as indicated by line 5—5 on Fig. 2. Fig. 6 is a transverse detailed sectional view taken substantially as indicated by line 6—6 on Fig. 2. Fig. 7 is an enlarged fragmentary vertical detailed sectional view illustrating the air inlet valve and the discharge valve. Fig. 8 is an enlarged fragmentary vertical detailed sectional view illustrating the anesthetic admitting valve and Fig. 9 is a transverse detailed sectional view illustrating one of the baffles.

The anesthetizing device of the present invention includes, generally, a hollow body 10, a mask 11 on the body 10, a tubular container 12 in the body 10 for holding a heating medium and forming or leaving an air chamber A and a mixing chamber B, means 13 for controlling the admission of air to the chamber A, a valved anesthetic reservoir 14 on the body 10 for supplying anesthetic to the chamber B, a valve 15 governing communication between the mixing chamber B and the mask 11, an outlet or discharge valve 16 for the mask 11 and various other parts, the functions and details of which will be hereinafter described.

The body 10 is preferably a substantially cylindrical hollow structure as illustrated in the drawings. The side wall 17 of the body 10 may be cylindrically curved while the upper and lower ends 18 and 19 of the body 10 may be flat and normal as illustrated. The central portion 20 of the body end 18 is depressed to have an upwardly facing socket 21. The socket 21 preferably has upwardly and outwardly inclined walls. A central opening 22 communicates with the bottom of the socket 21 and extends downwardly through a tubular extension 23. A peripheral apron 24 extends downwardly from the lower end 19 of the body 10. The body 10 is adapted to be formed of Bakelite, or the like, and is preferably sectional to facilitate its manufacture and assembly. In the structure illustrated the body 10 comprises two sections, namely, an upper section 10ª and a lower section 10ᵇ. A lapped joint 25 may be provided at the abutting ends of the body sections 10ª and 10ᵇ. The body sections 10ª and 10ᵇ are secured in assembled relation in the manner to be hereinafter described.

The mask 11 is adapted to be arranged or positioned on the face of the patient to cover his oral and nasal passages and to support the device in its operative position. The mask 11 is formed of Bakelite or the like and has a downwardly and outwardly inclined or flared wall 26 that is generally oval in plan elevation. The lower edge of the mask wall 26 is suitably curved to conform generally to the face of the patient. An inflatable sealing element 27 is provided on the lower end of the mask wall 26 to seal with the patient's face. The sealing element 27 is formed of rubber or the like and has an inlet fitting 28 by means of which it may be inflated to effectively seal with the patient's face. Lips or flanges 29 on the element 27 engage against the opposite surfaces of the wall 26 to removably secure the element to the mask.

The mask 11 includes a flat substantially horizontal integral top wall 30 at the upper end of the wall 26. A central cylindrical boss 31 projects upwardly from the top wall 30. A vertical opening 32 extends through the boss 31 to communicate with the interior of the mask 11. The interior of the mask 11 forms a breathing chamber C and receives the anesthesiant mixture from the chamber B as the patient inhales. Means is provided to connect the body 10 and mask 11 and to clamp together the body sections 10ª and 10ᵇ. Aligned vertical openings 33 are provided in the upper and lower walls 18 and 19 of the body 10. Screws 34 are passed inwardly or downwardly through these openings 33 and thread into openings 35 in the wall 30 of the mask 11. The heads of the screws 34 engage the upper wall 18 of the body 10. The mask 11 may be provided with means for admitting oxygen, nitrous oxide, etc. to the breathing chamber C. In the particular case illustrated in the drawings an integral fitting or boss 36 projects outwardly or laterally from the wall 26 of the mask 11. A tapered opening 37 extends through the boss 36 and communicates with the breathing chamber C. The opening 37 is adapted to receive the nipple (not shown) of a hose or conduit for supplying the desired gas to the breathing chamber C. The outer end of the opening 37 is normally closed by a pivoted cap or closure 38.

The tubular container 12 is a feature of the invention as it provides or defines the mixing chamber B and the air chamber A and is adapted to contain a heating medium for maintaining the proper temperatures in both chambers. The container 12 is preferably a cylindrical tubular structure having a cylindrical outer wall 39 spaced inwardly from the side wall 17 of the body 10, a cylindrical inner wall 40 defining the mixing chamber B and upper and lower ends 41 extending between and connecting the inner and outer walls 39 and 40. The container 12 is arranged concentric with the longitudinal axis of the body 10 and has its ends 41 spaced from the end walls 18 and 19 of the body. The container 12 is proportioned and positioned to leave or provide the air chamber A within the body 10 which substantially surrounds the container 12. The inner tubular wall 40 of the container 12 projects from the lower end 41 to extend through an opening 42 in the lower body wall 19. The container wall 40 may extend into the opening 32 as illustrated in the drawings and assists in mounting or supporting the container 12 in the body 10. Tubes 105 extend through the container 12 between its ends 41 and freely pass the screw 34. The tubes 105 are sealed with and secured to the container ends 41 and keep the screws 34 out of contact with the heating medium in the container 12.

The upper end of the mixing chamber B is open to the air chamber A while the valve 15 controls communication between the lower end of the mixing chamber B and the breathing chamber C. In the preferred construction illustrated in the drawings, the tubular extension 23 projects into the upper end of the mixing chamber B. Means is provided for pouring a suitable heating medium into the container 12. A tube 43 is secured to and projects laterally from the side wall 39 of the container. The inner end of the tube 43 is in communication with the interior of the tubular container. The tube 43 may be passed through an opening 44 in the side wall 17 of the body 10 and a lock nut or retaining nut 45 may be threaded on the tube to engage against the outer surface of the body. A suitable removable cap 46 may be threaded or otherwise secured to the projecting portion of the tube 43 to close the outer end of the tube and retain the heating medium in the container 12. Water or other suitable heating medium at a relatively high temperature may be poured into the container 12 through the tube 43 to heat the air chamber A and the mixing chamber B and thus provide for the heating of the air drawn into the chambers B and C and provide for the complete volatilization of the liquid anesthetic supplied to the chamber B by the reservoir 14.

The means 13 for controlling the admission of air to the chamber A is readily regulable so that the proper anesthesiant mixture of air and anesthetic may be maintained throughout the anesthesia. In accordance with the preferred form of the invention, air is admitted to the lower portion of the chamber A to pass upwardly through the chamber A around the container 12 and then flow inwardly to pass downwardly through the mixing chamber B. Elongate or arcuate air inlet ports 47 are provided in the bottom or lower wall 19 of the body 10 to communicate with the lower end of the air chamber A. The means 13 comprises a valve plate 48 adapted to cooperate with the lower surface of the lower end 19 of the body 10. The valve plate 48 is annular and surrounds the boss 31. Elongate or arcuate openings 49 are provided in the valve plate 48 and are adapted to communicate with the ports 47. The valve plate 48 is adapted to be turned to govern the extent of communication of the ports 49 with the ports 47. The ports 47 and 49 are preferably related so that the member 48 cannot be moved to a position where the ports 49 are entirely out of communication with the ports 47. Spaced ports 50 are provided in the apron 24 so that the ports 49 have direct communication with the atmosphere. Curved or arcuate openings 51 are provided in the valve plate 48 to receive the screws 34 with suitable clearance, so that the screws do not interfere with the proper turning of the valve plate 48. The ends of the openings 51 may cooperate with the screws 34 to limit the turning movement of the valve plate 48.

A slot or elongate opening 52 of substantial extent is provided in the apron 24. An operating lever or handle 53 is provided on the valve plate 48 and extends outwardly through the opening 52. The handle 53 facilitates the easy adjustment or turning of the valve plate 48. Spaced markings or calibrations 54 may be provided on the body wall 17 above the opening 52 and the handle 53 may have a pointer 55 to cooperate with the calibrations 54 to indicate the setting of the valve plate 48. Means is provided for urging the valve plate 48 into proper contact with the lower surface of the body end 19. Springs 56 surround the screws 34 and bear upwardly against the valve plate 48 to hold it in proper shiftable contact with the end 19 of the body. It is believed that it will be apparent how the valve plate 48 may be readily shifted by means of the handle 53 to provide for the desired admission of air to the air chamber A.

The anesthetic reservoir 14 is supported on the body 10 to supply the liquid anesthetic to the mixing chamber B. The reservoir 14 preferably includes a transparent cylindrical side wall 57 and ends 58 closing the opposite ends of the side wall 57. The transparent reservoir wall 57 may be formed of glass or the like while the ends 58 may be formed of Bakelite. The ends 58 preferably have beads or flanges 59 engaging about the external surface of the wall 57. A boss 60 is provided on the lower side of the lower end 58. Central vertical openings 61 are provided in the ends 58 and a tube 62 extends vertically through the openings 61. A flange 63 on the projecting lower portion of the tube 62 engages upwardly against the lower end of the boss 60 through a suitable gasket. A thimble 64 is threaded in the upper end of the tube 62 and has a flange 65 engaging against the upper end of the tube. A filling and air inlet opening 66 is provided in the upper end 58 of the reservoir 14. A cover 67 of suitable design is provided to normally close the opening 66 to prevent the excessive loss or evaporation of the anesthetic and yet admit some air to the reservoir. The cover 67 is arranged between the upper end 58 of the reservoir and the flange 65 having an opening 68 rotatably receiving the tube 62. A stop 69 is provided on the upper end 58 of the reservoir to stop the cover 67 in a position where it properly closes the opening 66. It is to be noted that the thimble 64 may be tightened against the end of the tube 62 to hold the parts of the reservoir 14 in the proper assembled relation without excessively tightening or clamping the cover 67.

A member 70 is threaded on the boss 60 to support the reservoir 14 on the body 10. The member 70 has an opening or socket 71 in its upper end and its lower portion is tapered to effectively fit the body socket 21. The member 70 may be easily fitted in the socket 21 to support the reservoir 14 on the body 10 and may be turned with the reservoir to bring the opening 66 of the reservoir to any desired rotative position with respect to the mask 11 to permit the device to be arranged in inclined positions without the loss or spilling of anesthetic from the reservoir. The member 70 may be easily removed or disengaged from the socket 21 to permit the easy filling of the reservoir and the container 12. The member 70 has a reduced portion 72 extending downwardly through the opening 22 to project into the mixing chamber B. Inspection openings 73 are provided in the wall of the member 70 to communicate with its socket 71. A tube 74 of glass or the like is arranged in the socket 71 to close the openings 73. Reinforcing ribs 75 may be provided on the member 70 to engage against the lower end 58 of the reservoir 14. The portion 72 has a reduced vertical opening 76 extending from the socket 71 to the mixing chamber B to conduct the liquid anesthetic to the mixing chamber.

The invention includes valve means for controlling the delivery of the liquid anesthetic from the reservoir 14 to the mixing chamber B. Lateral ports 77 are provided in the wall of the tube 62 to communicate with the lower portion of the reservoir 14. A head 78 is provided on the lower end of the tube 62 within the socket 71. The head 78 has a reduced discharge opening 79. A needle valve 80 is provided to cooperate with the opening 79 to govern the discharge of the anesthetic from the reservoir 14 to the socket 71. The needle valve 80 has a stem 81 extending longitudinally through the tube 62. The valve stem 81 is threaded through the thimble 64 to project from the upper end of the reservoir 14. A knurled knob 82 is provided on the projecting upper end of the stem 81 to facilitate the easy adjustment of the needle valve 80. A spring 83 is arranged under compression between the knob 82 and the flange 65 to yieldingly hold the stem 81 in the desired adjusted or set position. The head 78 is visible through the inspection openings 73 and the setting of the valve 80 may be readily determined by observing the rate of discharge or dripping of the anesthetic from the port 79.

The invention includes improved baffle means in the mixing chamber B to effectively break up the liquid anesthetic discharged from the opening 76. A plurality of vertically spaced baffles is provided in the mixing chamber B. In the particular case illustrated there are three baffles 84, 84b and 84c. The baffles are disc shaped and their peripheries are spaced from the wall of the chamber B leaving annular spaces through which air and the mixture of air and vaporized anesthetic may flow. Circumferentially spaced feet or lugs 85 are provided on the baffles 84, 84b and 84c and are secured to the wall of the chamber B to support the baffles in position. The baffles 84, 84b and 84c are alternately curved in opposite directions. The upper and lower baffles 84 and 84c have convex upper surfaces while the intermediate baffle 84b has a concave upper surface. One or more of the baffles 84, 84b and 84c are perforate. In the case illustrated the intermediate concave baffle 84b is perforate or provided with a plurality of spaced relatively small ports 86.

The liquid anesthetic passed or discharged by the valve 80 drips from the opening 79 and passes through the opening 76 to drop into the mixing chamber B. This anesthetic falls onto the uppermost baffle 84 and flows over its upper surface to drip from its periphery. The anesthetic that falls from the upper baffle 84 is caught or received by the concave intermediate baffle 84b and flows inwardly on the upper surface of the baffle 84b and may flow through the ports 86. The anesthetic that remains in a liquid condition and that discharges from the ports 86 may strike the upper concave surface of the lower baffle 84c and is further broken up and distributed over its surface. In practice the anesthetic dripping from one baffle to the other and flowing over the surfaces of the several baffles in the heated mixing chamber B is thoroughly vaporized before reaching the periphery or outer edge of the lowermost baffle 84c.

The breathing valve or inlet valve 15 is provided to govern communication between the mixing chamber B and the breathing chamber C of the mask 11. The valve 15 includes a plug-like member 87 threaded in the opening 32. The member 87 may extend upwardly into the lower portion of the container wall 40. A flange 88 on the lower end of the member 87 bears upwardly against the lower surface of the mask top 30. A cavity or socket 89 enters the member 87 from its lower end. An opening 90 of reduced diameter extends upwardly from the socket 89 to communicate with the lower end of the chamber B. The upper wall of the socket 89 forms a valve seat. A valve disc 91 is adapted to seal upwardly against the upper wall of the socket 89 to close the opening 90 and thus close the lower end of the chamber B. A perforated plate 92 is secured at the lower end of the member 87 by screws 93. A helical spring 94 is arranged under compression between the plate 92 and the valve disc 91 to yieldingly hold the valve disc in its closed position where it closes the opening 90. A screw 95 may be provided on the plate 92 to center and guide the spring 94. The tension or strength of the spring 94 is such that the valve disc 91 moves to the open position when a reduced pressure is created in the breathing chamber C by the patient inhaling. A well 96 is provided in the upper end of the member 87 to receive and trap any liquid anesthetic that may drip from the lowermost baffle 84c. The well 96 is annular and surrounds the opening 90. The well 96 traps any liquid anesthetic that may reach the lower end of the chamber B and prevents it from passing downwardly through the opening 90. Any liquid anesthetic received by the well 96 quickly vaporizes in the heated mixing chamber B.

The discharge valve or exhaust valve 16 controls the escape of the exhaled air and carbon dioxide from the breathing chamber C. The valve 16 is in the nature of an automatic check valve. A plurality of spaced ports 97 is provided in the top wall 30 of the mask 11. The ports 97 communicate with the breathing chamber C. The ports 97 are preferably enlarged or counterbored at their upper ends for the purpose to be hereinafter described. A flexible valve ring or sealing member 98 is adapted to cooperate with the upper surface of the wall 30 of the mask 11 to normally close the ports 97. The sealing member 98 may be formed of rubber or the like and is annular to surround the boss 31. The sealing member 98 is flat to normally rest on and seal against the wall 30. Means is provided for retaining the sealing member 98 in position. A ring 99 of metal, Bakelite, or the like, surrounds the boss 31 and seats against the upper side of the member 98. The screws 34 pass through openings in the valve member 98 and ring 99 as shown in Fig. 4 of the drawings. The above described springs 56 bear downwardly on the ring 99 so that the ring presses against the member 98 to hold it in position. Washers 100 may be provided between the lower ends of the springs 56 and the ring 99.

The portion 99a of the ring 99 above the series of ports 97 is bent or inclined upwardly and outwardly to permit the adjacent portion of the sealing member 98 to flex upwardly when an increased pressure is developed in the chamber C. The resiliency of the sealing member 98 automatically returns the member to its closed position where it seals the ports 97. In practice the member 98 is formed to automatically close while a pressure above normal still exists in the breathing chamber C to retain or trap a portion of the exhaled carbon dioxide in the chamber for re-breathing by the patient. The resilient member 98 is very silent in operation. The above mentioned enlargements or counterbores at the upper ends of the ports 97 prevent the accumulation of liquid or condensate on the surface of the wall 30 and thus prevent such liquid from interfering with the silent proper operation of the member 98.

To condition the device for administering an anesthetic a suitable quantity of ether or other liquid anesthetic is provided in the reservoir 14. If desired the member 79 may be removed from the socket 21 to detach the reservoir 14 from the body 10, for the purpose of filling the reservoir and the container 12. Water, or other suitable heating medium, is poured into the container 12 at a relatively high temperature. In practice it has been found desirable to provide water in the container 12 at a temperature of about 212° immediately before administering the anesthetic. The needle valve 80 may be adjusted or regulated to provide for the desired or proper delivery of liquid anesthetic to the mixing chamber B. The setting of the needle valve 80 may be readily determined by observing the liquid anesthetic discharging from the port 79. The handle 53 may be manipulated to set the valve 13 and provide for the desired admission of air to the chamber A.

The device is then placed on the face of the patient so that the mask 11 covers the oral and nasal cavities. In certain instances it may be necessary to adjust or turn the reservoir 14 to a position where the anesthetic will not spill through the opening 66. The sealing element 27 seals against the patient's face to close the lower end of the breathing chamber C so that the chamber is under the control of the valves 15 and 16.

The water or heating medium in the container 12 effectively heats the air chamber A and the mixing chamber B. The air drawn through the ports 47 into the chamber A is warmed or heated during its passage around the container 12 and enters the upper end of the mixing chamber B in a warm or heated state. The baffles 84, 84$^b$ and 84$^c$ within the chamber B are heated by the fluid in the surrounding container 12. The liquid anesthetic dropping from the port 79 strikes the heated upper baffle 84 and is partially broken up to vaporize in the heated mixing chamber B. Liquid anesthetic may drip from the periphery of the convex baffle 84 to fall onto the concave baffle 84$^b$. The anesthetic is further broken up striking the baffle 84$^b$ and vaporizes in the heated chamber B. In practice little or no liquid anesthetic falls from the baffle 84$^b$ to the baffle 84$^c$. The liquid anesthetic introduced into the upper end of the chamber B is thoroughly broken up and vaporized in the heated air before it reaches the opening 90. When the patient inhales, a reduced pressure is created in the breathing chamber C, the valve disc 91 opens and the heated anesthesiant mixture is drawn into the chamber C. This anesthesiant mixture is, of course, breathed by the patient. When the patient exhales, the valve disc 91 automatically closes so that an increased pressure is formed in the breathing chamber C. This increased pressure flexes the member 98 outwardly and the carbon dioxide is discharged through the ports 97. As described above, the member 98 is such that it closes while a higher than normal pressure still exists in the chamber C so that a certain proportion of carbon dioxide is trapped in the chamber C for rebreathing.

The needle valve 80 and the valve means 13 may be regulated from time to time to govern the character of the anesthesiant mixture delivered to the chamber C. In practice it has been found that water placed in the container C at a temperature of about 212 degrees immediately before the administering of the anesthetic maintains the proper temperatures in the chambers A and B throughout the anestesia. During the induction period of the anesthesia it is desirable to maintain relatively high temperatures in the chamber A and the chamber B and to have lower temperatures during the subsequent phases of the anesthesia. It has been found that the water or heating medium in the container 12 cools at approximately the desired rate in relation to the rate at which the liquid anesthetic is delivered to the chamber B. In other words, as the temperature of the heating medium in the container 12 lowers, the anesthetic is delivered to the chamber B at a slower rate and is completely vaporized by the heated air in the chamber B. It is to be particularly noted that the air drawn into and through the chamber A is warmed or heated before reaching the mixing chamber B. The air enters the ports 47 and passes upwardly through the chamber A around the container 12 and is properly warmed or heated before reaching the chamber B. The chamber B is also maintained at a suitable high temperature by the liquid in the surrounding container 12.

The apparatus operates to deliver a warmed anesthesiant mixture of air and fully vaporized anesthetic so that there are very short stages of induction and excitation. The device induces anesthesia with little or no nausea, headache, bronchial irritation or other ill effects. Premedication may or may not be used in administering an anesthetic with the apparatus, the blood pressure varies only slightly and the blood is highly aerated throughout the entire period of the anesthesia. The apparatus may be easily and fully governed and controlled to produce the desired effects.

Having described only a typical preferred form and application of my invention, I do not wish to be limited or restricted to the specific details herein set forth, but wish to reserve to myself any variations or modifications that may appear to those skilled in the art or fall within the scope of the following claims.

Having described my invention, I claim:

1. A device for administering anesthetics including, a hollow body, a container in the body for holding a heating medium and including an outer tubular wall spaced from the body to leave an air chamber therein, and an inner tubular wall spaced from and within the outer wall, the said inner wall defining a mixing chamber having one end in communication with the air chamber, means for delivering anesthetic to said end of the mixing chamber, and a mask for receiving the anesthesiant mixture from the other end of the mixing chamber.

2. A device for administering anesthetics including, a hollow body, a container in the body for holding a heating medium and spaced from the body to leave an air chamber therein, the container being shaped to define a mixing chamber having one end in communication with the air chamber, the body having a port admitting air to the lower portion of the air chamber to pass therethrough to said end of the mixing chamber, means for delivering anesthetic to said end of the mixing chamber, and a mask for receiving the anesthesiant mixture from the other end of the mixing chamber.

3. Apparatus for administering anesthetics including, a container for containing a heated fluid and shaped to define a chamber, a body arranged around the container in spaced relation thereto to have an air chamber heated by said fluid, said chambers being in communication, a mask in connection with the body to receive the anesthesiant mixture from the first named chamber, and means for discharging anesthetic into the first named chamber.

4. Apparatus for administering anesthetics including, a container for containing a heated fluid and shaped to define a mixing opening, a body arranged around the container in spaced relation thereto to have an air chamber heated by said fluid, said chamber being in communication with said opening, regulable means for admitting air to the air chamber to flow therethrough to the said opening, a mask in connection with the body to receive the anesthesiant mixture from the said opening, and means for discharging anesthetic into the said opening.

5. Apparatus for administering anesthetics including, a container for containing a heated fluid and shaped to define an anesthesiant mixing chamber, a body arranged around the container in spaced relation thereto to have an air chamber heated by said fluid, said chambers being in communication, a reservoir on the body for containing a liquid anesthetic, means governing the discharge of anesthetic from the reservoir to the first named chamber, and a mask on the body having a breathing chamber adjacent the first named chamber and adapted to receive the anesthetic mixture therefrom.

6. Apparatus for administering anesthetics including, a container for containing a heated fluid and shaped to define an anesthesiant mixing chamber, a body arranged around the container in spaced relation thereto to have an air chamber heated by said fluid, said chambers being in communication, regulable means for admitting air to the air chamber to flow therethrough to the first named chamber, a liquid anesthetic reservoir on the body, valve means for discharging anesthetic from the reservoir into the first named chamber, and a mask in connection with the body for receiving the anesthesiant mixture from the first named chamber.

7. Apparatus for administering anesthetics including, a container for containing a heated fluid and shaped to define an anesthesiant mixing chamber, a body arranged around the container in spaced relation thereto to have an air chamber heated by said fluid, said chambers being in communication, a reservoir on the body for containing a liquid anesthetic, means governing the discharge of anesthetic from the reservoir to the first named chamber, baffle means in the first named chamber for breaking up the liquid anesthetic, and a mask on the body having a breathing chamber adjacent the first named chamber and adapted to receive the anesthetic mixture therefrom.

8. Apparatus for administering anesthetics including, a container for containing a heated fluid and shaped to define a chamber, a body arranged around the container in spaced relation thereto to have an air chamber heated by said fluid, said chambers being in communication, a reservoir on the body for containing a liquid anesthetic, means governing the discharge of anesthetic from the reservoir to the first named chamber, a mask on the body having a breathing chamber adjacent the first named chamber, and a valve controlling communication between said first named chamber and the breathing chamber.

9. Apparatus for administering anesthetics including, a container for containing a heated fluid and shaped to define a chamber, a body arranged around the container in spaced relation thereto to have an air chamber heated by said fluid, said chambers being in communication, the body having a port admitting air to the lower portion of the air chamber to flow upwardly therethrough and enter the first named chamber, a reservoir on the body for carrying liquid anesthetic, valve means for controlling the discharge of the anesthetic from the reservoir to the upper end of the first named chamber, vertically spaced baffles in the first named chamber, and a mask for receiving the anesthesiant mixture from the lower end of the second named chamber.

10. Apparatus for administering anesthetics including, a container for containing a heated fluid and shaped to define a chamber, a body arranged around the container in spaced relation thereto to have an air chamber heated by said fluid, said chambers being in communication, the body having a port admitting air to the lower portion of the air chamber to flow upwardly therethrough and enter the first named chamber, a reservoir on the body for carrying liquid anesthetic, valve means for controlling the discharge of the anesthetic from the reservoir to the upper end of the first named chamber, vertically spaced baffles in the first named chamber, a mask for receiving the anesthesiant mixture from the lower end of the second chamber, a valve controlling communication between the said first named chamber and the mask, and an exhaust valve on the mask.

11. In a device for administering anesthetics, a container for holding a heating fluid, the container being shaped to define an opening which constitutes a mixing chamber, means delivering liquid anesthetic to the upper end of the chamber, and vertically spaced baffles in the chamber for breaking up the liquid anesthetic, at least one of said baffles presenting a convex upper surface.

12. In a device for administering anesthetics, a container for holding a heating fluid, the container being shaped to define a mixing chamber, means delivering liquid anesthetic to the upper end of the chamber, and vertically spaced baffles in the chamber for breaking up the liquid anesthetic, at least one of said baffles presenting a convex upper surface and at least one of said baffles being perforate and presenting a concave upper surface.

13. In a device for administering anesthetics, a container for holding a heating fluid, the container being shaped to define a mixing chamber, means delivering liquid anesthetic to the upper end of the chamber, a body surrounding the container in spaced relation thereto to leave an annular air space for supplying heated air to the upper end of the mixing chamber, a mask, a tubular part connecting the lower end of the mixing chamber with the interior of the mask, there being spaced ports in the body for admitting air to the air chamber, and a turnable valve member surrounding said part and controlling the ports.

14. In a device for administering anesthetics, a container for holding a heating fluid, the container being shaped to define a mixing chamber, means delivering liquid anesthetic to the upper end of the chamber, a body surrounding the container in spaced relation thereto to leave an annular air space for supplying heated air to the upper end of the mixing chamber, a mask, a tubular part connecting the lower end of the mixing chamber with the interior of the mask, there being an exhaust port in the mask, and a flexible member on the mask controlling the exhaust port.

15. In a device for administering anesthetics, a container for holding a heating fluid, the container being shaped to define a mixing chamber, means delivering liquid anesthetic to the upper end of the chamber, a body surrounding the container in spaced relation thereto to leave an annular air space for supplying heated air to the upper end of the mixing chamber, a mask, a tubular part connecting the lower end of the mixing chamber with the interior of the mask, there being an exhaust port in the mask, and a rubber member surrounding said part and controlling the exhaust port.

GARNET KING.